(12) United States Patent
Wang et al.

(10) Patent No.: US 8,793,201 B1
(45) Date of Patent: Jul. 29, 2014

(54) SYSTEM AND METHOD FOR SEEDING RULE-BASED MACHINE LEARNING MODELS

(75) Inventors: Jue Wang, Redmond, WA (US); Madhu M. Kurup, Bellevue, WA (US); Srikar Yekollu, Sunnyvale, CA (US)

(73) Assignee: Amazon Technologies, Inc., Reno, NV (US)

(*) Notice: Subject to any disclaimer, the term of this patent is extended or adjusted under 35 U.S.C. 154(b) by 337 days.

(21) Appl. No.: 13/283,428

(22) Filed: Oct. 27, 2011

(51) Int. Cl.
*G06F 15/18* (2006.01)

(52) U.S. Cl.
USPC .......................................................... 706/13

(58) Field of Classification Search
CPC ..... G06N 3/126; G06N 7/005; G06N 99/005; G06F 17/30
See application file for complete search history.

(56) References Cited

U.S. PATENT DOCUMENTS

| | | | | |
|---|---|---|---|---|
| 6,532,453 | B1 * | 3/2003 | Koza et al. | 706/13 |
| 6,556,991 | B1 * | 4/2003 | Borkovsky | 707/737 |
| 7,725,475 | B1 * | 5/2010 | Alspector et al. | 707/758 |
| 7,734,627 | B1 * | 6/2010 | Tong | 707/737 |
| 7,814,107 | B1 * | 10/2010 | Thirumalai et al. | 707/749 |
| 7,882,048 | B2 * | 2/2011 | Bonabeau et al. | 706/13 |
| 7,895,225 | B1 * | 2/2011 | Thirumalai et al. | 707/758 |
| 7,904,462 | B1 * | 3/2011 | Thirumalai et al. | 707/749 |
| 8,527,475 | B1 * | 9/2013 | Rammohan et al. | 707/692 |
| 8,577,814 | B1 * | 11/2013 | Wu et al. | 706/12 |
| 2006/0167864 | A1 * | 7/2006 | Bailey et al. | 707/3 |
| 2008/0313165 | A1 * | 12/2008 | Wu et al. | 707/5 |
| 2009/0089314 | A1 * | 4/2009 | Hicks | 707/102 |
| 2009/0228410 | A1 * | 9/2009 | Veeramachaneni | 706/12 |
| 2011/0225038 | A1 | 9/2011 | Fontoura et al. | |
| 2012/0259802 | A1 * | 10/2012 | Arasu et al. | 706/12 |
| 2012/0278263 | A1 * | 11/2012 | Borthwick et al. | 706/12 |

OTHER PUBLICATIONS

Bilenko M. et al., "Adaptive Duplicate Detection Using Learnable String Similarity Measures", SIGKDD '03, Aug. 24-27, 2003, Washington, DC, USA, pp. 39-48.*

Bilenko M. et al., "Adaptive Product Normalization: Using Online Learning for Record Linkage in Comparison Shopping", Proceedings of the Fifth IEEE International Conference on Data Mining (ICDM'05), 2005.*

(Continued)

*Primary Examiner* — Jeffrey A Gaffin
*Assistant Examiner* — Dave Misir
(74) *Attorney, Agent, or Firm* — Robert C. Kowert; Meyertons, Hood, Kivlin, Kowert & Goetzel, P.C.

(57) ABSTRACT

Embodiments of a system and method for seeding rule-based machine learning models include generating a set of seed rules including one or more rules resulting from one or more previously performed machine learning operations and one or more randomly or pseudo-randomly generated rules. Embodiments may include performing one or more machine learning operations on the set of seed rules to generate a new set of rules for determining whether a pair of information items have a specific relationship. Generating the new set of rules from the seed rules may be faster than generating a set of rules from random data. Embodiments may also include applying the new set of rules to one or more pairs of information items to identify at least one pair of information items as having the specific relationship. For instance, the rules may be applied to identify pairs of information items that are duplicate pairs.

28 Claims, 11 Drawing Sheets

(56) References Cited

OTHER PUBLICATIONS

Bilenko M. et al., "Adaptive Blocking: Learning to Scale Up Record Linkage", Proceedings of the Sixth International Conference on Data Mining (ICDM'06), 2006.*

Koh J. et al., "Duplicate Detection in Biological Data using Association Rule Mining", Proceedings of the Second European Workshop on Data Mining and Text Mining in Bioinformatics, 2004.*

Carvalho M. et al., "Replica Identification using Genetic Programming", SAC'08 Mar. 16-20, 2008, Fortaleza, Ceara, Brazil, pp. 1801-1806.*

Isele R. et al., "Learning Linkage Rules using Genetic Programming", Proceedings of the Sixth International Workshop on Ontology Matching at ISWC, vol. 814, Oct. 24, 2011.*

F. Yoav and S. Robert E. A short introduction to boosting. Journal of Japanese Society for Artificial, IntelligenceJournal of Japanese Society for Artificial Intelligence, 14(5): pp. 771-780, 1999.

* cited by examiner

|   |   |
|---|---|
| IPQ | Matching_direction: one-way<br>Matching_function: exact<br>Source_attribute: item_package_quantity<br>Target_attrbiute: item_package_quantity<br>Matching_threshold: 1.0<br>Accept_missing: no |
| image_id | NULL |
| part_number | NULL |
| gtin | Matching_direction: symmetric<br>Matching_function: exact<br>Source_attribute: gtin<br>Target_attrbiute: gtin<br>Matching_threshold: 1.0<br>Accept_missing: yes |
| title_1 | Matching_direction: one-way<br>Matching_function: exact<br>Source_attribute: alphabetic_item_name<br>Target_attrbiute: item_name<br>Matching_threshold: 0.95<br>Accept_missing: no |
| title_2 | Matching_direction: symmetric<br>Matching_function: fuzzy<br>Source_attribute: item_name<br>Target_attrbiute: item_name_and_product_description<br>Matching_threshold: 0.65<br>Accept_missing: no |

302 — left column; 304 — right column; 300 — table

FIG. 3

SYSTEM AND METHOD FOR SEEDING RULE-BASED MACHINE LEARNING MODELS

BACKGROUND

Merchants that operate network-accessible marketplaces may maintain electronic catalogs that include thousands of items (or more) offered for sale. These electronic catalogs often include item detail pages accessible through one or more networks (e.g., web pages accessible over the Internet). These item detail pages often include descriptive information (e.g., text descriptions, pictures or video) in order to assist a buyer in determining whether an item is worth purchasing. In many cases, this descriptive information may be based on information from manufacturers or suppliers of the items offered for sale. In some cases, different manufacturers and suppliers may provide the descriptive information to the merchant in different formats. For example, one supplier may list one type of identifier for an item as a part number whereas another supplier of that same item might list that identifier as a model number. In some cases, some suppliers may provide very detailed item information for an item whereas another supplier might provide very basic information. For instance, one supplier might include a text description including comprehensive marketing literature whereas another supplier might omit such description and only include basic information, such as a part or model number. Due at least in part to these types of variations in item information received from different suppliers of the same item, identifying duplicate item information may include significant quantity of time and computing resources.

BRIEF DESCRIPTION OF THE DRAWINGS

FIG. 3 illustrates an example population individual or duplicate detection rule, according to some embodiments.

Figure 1:
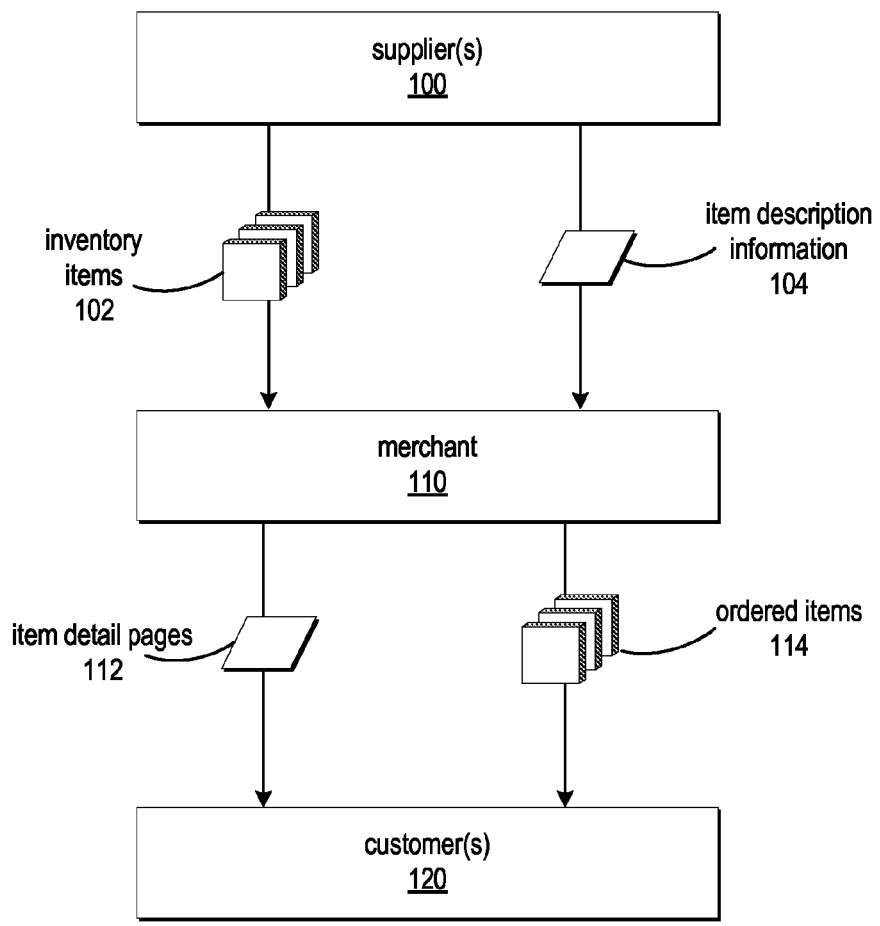
FIG. 1 illustrates a block diagram illustrating a merchant's acquisition and use of item description information, according to some embodiments.

While the system and method for seeding rule-based machine learning models is described herein by way of example for several embodiments and illustrative drawings, those skilled in the art will recognize that the system and method for seeding rule-based machine learning models is not limited to the embodiments or drawings described. It should be understood that the drawings and detailed description thereto are not intended to limit the system and method for seeding rule-based machine learning models to the particular form disclosed, but on the contrary, the intention is to cover all modifications, equivalents and alternatives falling within the spirit and scope of the system and method for seeding rule-based machine learning models as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for seeding rule-based machine learning models are described. These rule-based machine learning models may utilize any computer-implemented machine learning technique including but not limited to genetic algorithm (GA) techniques, decision trees (including boosted decision trees), and other machine learning techniques, whether presently known or developed in the future. In various embodiments, a machine learning model may generally include a collection of rules generated by these machine learning techniques, although such models are not limited to including such rules. For instance, as described in more detail below, duplicate detection rules may be generated for determining whether pairs of item description entries are duplicates (e.g., whether such entries described the same item), determining whether items are related (e.g., for advertising recommendation purposes), or determining whether items are unique. Various embodiments may leverage the results of one machine learning model to accelerate the process of generating other machine learning models while retaining or improving the quality of the machine learning models generated. For instance, as described in more detail below, rules from one machine learning model may be used as seed rules for the generation of another machine learning model (e.g., for the generation of another rule set). In cases where GA techniques are utilized, this process may leverage the genetic material (e.g., rules and rule conditions) of one model to accelerate the generation of rules for another model.

In some embodiments, rule sets may be specific to a particular category of items. For instance, within the context of an electronic marketplace, different categories might include electronics, sporting goods, tools, and other categories or subcategories. In these cases, a machine learning model generated for one category may be used to accelerate the generation of rules for another similar or related category. For instance, as described in more detail below, rules from a previously generated machine learning model for one product category may be used as seed rules for generating a machine learning model (e.g., a new set of rules) for a similar or related product category. By starting the generation of a machine learning model (e.g., a new set of rules) with seed rules from a previously generated machine learning model, embodiments may reduce the generation time of the new model (e.g., relative to the requisite time for generating a new model from an entirely random set of rules).

Example Item Description Information

FIG. 1 illustrates a flow diagram of interactions between a merchant and its suppliers and customers. In the illustrated embodiments, merchant 110 may receive inventory items 102 from one or more suppliers. These suppliers may also provide item description information 104 to the merchant. For instance, the item description information may include details and characteristics (e.g., images, videos, text descriptions, specifications, part numbers, model numbers, manufacturer information and other information about an item) that may be used to construct item detail pages 112 viewed by customers; customers may order items 114 from the merchant based on information in the item detail pages. In various embodiments, the merchant may use the item description information as the basis for identifying an item received from a supplier. In many cases, the provided item description information may vary among different suppliers, even in cases where the item description information pertains to the same item. For example, the item description information may differ across suppliers for any of a variety of reasons including but not limited to differences in nomenclature or differences in the amount of detail that a merchant provides for a given item.

In various embodiments, item description information may be stored by the merchant as item description entries which may adhere to a structured or semi-structured format. For clarity of description, different item description entries that pertain to the same item may be referred to herein as duplicate item description entries. The machine learning models described herein may be configured to analyze item description entries in order to determine whether the item description entry for one item and the item description entry for another item are duplicates.

In some embodiments, the duplicate detection engine may be utilized to identify duplicate item description entries (e.g., entries that correspond to the same item offered for sale) such that the entries may be merged. For example, a merchant may rely on item description entries to generate item detail pages that are available to customers. For instance, item detail pages could be web pages available through a network-based marketplace and customers could browse such item detail pages from remote client devices equipped with web browsers. In this example, the presence of duplicate item description entries could result in the creation of two or more item detail pages for the same item. In some cases, it may be desirable to avoid this situation as it may provide a fragmented browsing experience for customers and may discourage price competition among third party sellers. By identifying and merging duplicate item description entries, embodiments may prevent the creation of two or more item detail pages for the same item. The situation above may be characterized as a false negative as the merchant failed to identify two items as duplicates when those items were actually duplicates. While this may fragment the browsing experience because two redundant item detail pages (e.g., web pages that offer the items for sale) may be created for the same item, it is unlikely to cause significant harm to the customer-merchant relationship. For instance, if a customer orders the item from either of the redundant web pages, the customer will still receive the item they expect to receive (e.g., the item they ordered). On the other hand, false positives may cause more harm to the customer-merchant relationship. Consider the case where a false positive in the merchant's classification scheme leads the merchant to believe that item A and item B are duplicates when in reality they are very different items. In this case, the merchant may mistakenly merge its representation of the two different items into a common representation, such as by merging the item detail pages and/or the inventory records of the two items. As such, a customer that orders item A might erroneously receive item B or vice versa. In the examples above, the customer-merchant relationship is more severely impacted in a negative manner by false positive misclassification of two non-duplicates as a duplicate.

Example Duplicate Item Description Entries

Figure 2:
FIG. 2 illustrates an example of item description information, according to some embodiments.

Embodiments may also include applying the new set of rules to one or more pairs of information items to identify at least one pair of information items as having the specific relationship. These information items may include the item description information described above, which may in some cases be structured as distinct item description entries for different items. In various embodiments, the rules described herein may be applied to identify pairs of information items that are duplicate pairs. For example, the rule sets generated with the seeding techniques described herein may be utilized by a duplicate detection engine to detect duplicate item description entries within a data store of item description information. In some cases, duplicate item description entries may vary due to differences in the manner that suppliers (e.g., vendors, manufacturers, etc.) structure item description information. For instance, two different suppliers may provide units of the same item to a merchant. Each supplier may also provide item description information for the item in different formats. FIG. 2 illustrates one example of such information. In the illustrated embodiment, the item description information may include multiple different properties 200 for a particular item, such as various identifiers, characteristics, and descriptions. As illustrated, the item description information for the same item may vary across suppliers. For instance, item description information 202 may be provided by one supplier and item description information 204 may be provided by another supplier; this information may be different even though it pertains to the same item, namely a specific oxygen sensor in the illustrated example. The item description information may differ across suppliers for any of a variety of reasons including but not limited to differences in nomenclature. For example, one supplier may refer to an item identifier as a part number whereas another identifier may refer to that same identifier as a model number. In another example, suppliers may use different terms or phrases to describe the type of product that an item is. In the illustrated example, one supplier refers to the example oxygen sensor as being part of an "auto_part" product type and the other supplier refers to the sensor being part of an "auto_accessory" product type.

In various instances, if these types of differences are not recognized, the merchant or other entity that receives the item description information may interpret the information as pertaining to two different items even in cases where such information does indeed described the same item. For clarity of description, different item description entries that pertain to the same item may be referred to herein as duplicate item description entries or simply "duplicates." In the illustrated example, item description entries 202 and 204 represent duplicates. The presence of duplicates within a merchant's catalog may have a variety of implications including but not limited to the false negatives and false positives described above with respect to FIG. 1.

Example Rule

FIG. 2 illustrates an example of two item description entries that are duplicates. In the illustrated embodiment, the item description information may include multiple different attributes 200 (also referred to as properties) for a particular item, such as various identifiers, characteristics, and descriptions. As illustrated, the item description information for the same item may vary across suppliers. For instance, item description information 202 may be provided by one supplier and item description information 204 may be provided by another supplier; this information may be different even though it pertains to the same item, namely a specific oxygen sensor in the illustrated example. For example, in the illustrated example, one supplier refers to the example oxygen sensor as being part of an "Auto part" product type and the other supplier refers to the sensor being part of an "Auto accessory" product type. In any case, the two item description entries contain rich data and the duplicate detection engine described herein may identify these entries as duplicates based on such data.

Example Rule and Rule Conditions

In various embodiments, to reduce or eliminate the presence of duplicate item description entries, merchants (or other entities) may utilize a rule-based duplicate detection system to identify and/or merge such duplicates into single entries. As described in more detail below, the duplicate detection system may include a duplicate detection engine configured to use a rule set to evaluate multiple item description entries and identify and/or merge duplicate entries. In various embodiments, such a rule set may include multiple rules, each of which may include multiple rule conditions. FIG. 3 illustrates one such example rule. In the illustrated embodiment, rule 300 includes multiple rule conditions 302, each of which may include one or more elements 304. For instance, the first rule condition of the illustrated rule pertains to item package quantity or "IPQ." Additionally, the IPQ rule condition includes multiple parameters that generally specify how a portion of one item description entry should be compared to another item description entry for duplicate detection. For the illustrated IPQ rule condition, the condition parameters specify that one-way evaluation of the source attribute and the target attribute is sufficient. In this case, the source attribute is the "item_package_quality" attribute of the first item description entry and the target attribute is the "item_package_quality" attribute of the second item description entry. As illustrated, a rule condition may also designate a particular matching function with which to compare the attributes. Also illustrated, the condition may specify a matching threshold score that should be met in order for the rule condition to be met. In the IPQ rule condition, this threshold score is 1.0. In other words, the "exact" matching function must at a minimum return a score of 1.0 in order for the IPQ rule condition to resolve to true for the pair of item description information entries being evaluated.

In the illustrated embodiment, a number of other rule conditions are illustrated (e.g., "gtin," "title_1" and "title_2"). In some cases, other available rule conditions may not be used for this particular rule. As illustrated, these rule conditions are marked "null" for rule 300. In various embodiments, various other rule conditions for evaluating pairs of item description entries may be utilized. For instance, rule conditions that are not illustrated and/or variations of the illustrated rule conditions may be utilized. Furthermore, while not illustrated in the particular example rule of FIG. 3, the rule conditions of a given rule may be associated by one or more Boolean logic operators (e.g., AND, OR, etc.). For instance, the "AND" Boolean operator may be utilized to specify that in order for one item description entry to be considered a duplicate of another item description entry, all rule conditions of the rule must be met. Rules themselves may also be linked or associated with other rules through similar Boolean logic operators.

As noted above, in various embodiments multiple rules may be aggregated together as part of one or more rule sets, which may be interpreted and utilized by a duplicate detection engine in order to identify and/or merge item description entries. In various embodiments, the rule set(s) may be generated utilizing genetic techniques, as described in more detail below. Generally, when compared to administrator-generated rule sets, the use of genetic techniques may result in faster creation of a given rule and/or a rule set that yields better recall and precision.

Machine Learning Techniques for Creation of a Rule Set

Figure 4:
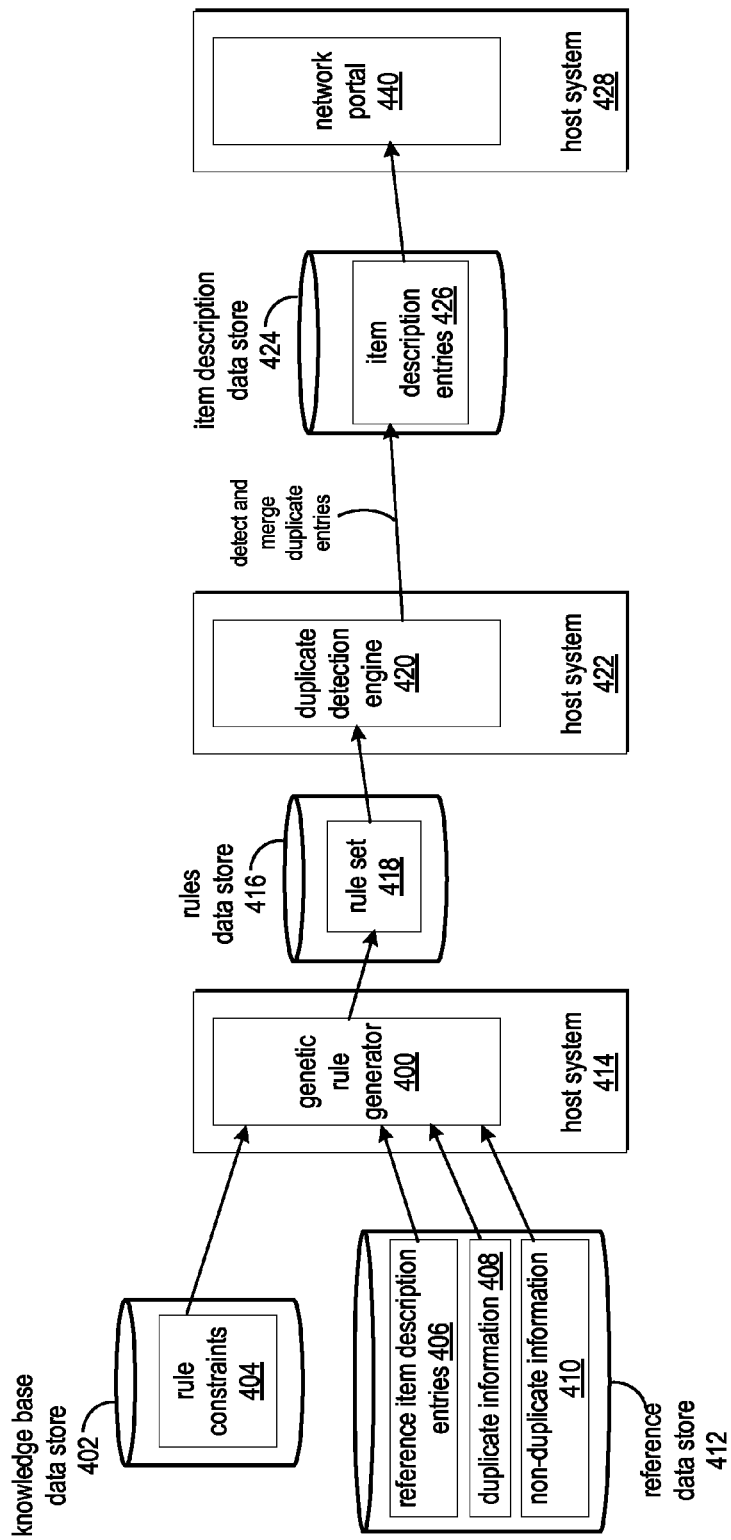
FIG. 4 illustrates a block diagram of the elements of a system and method for seeding rule-based machine learning models, according to some embodiments.
Figure 5:
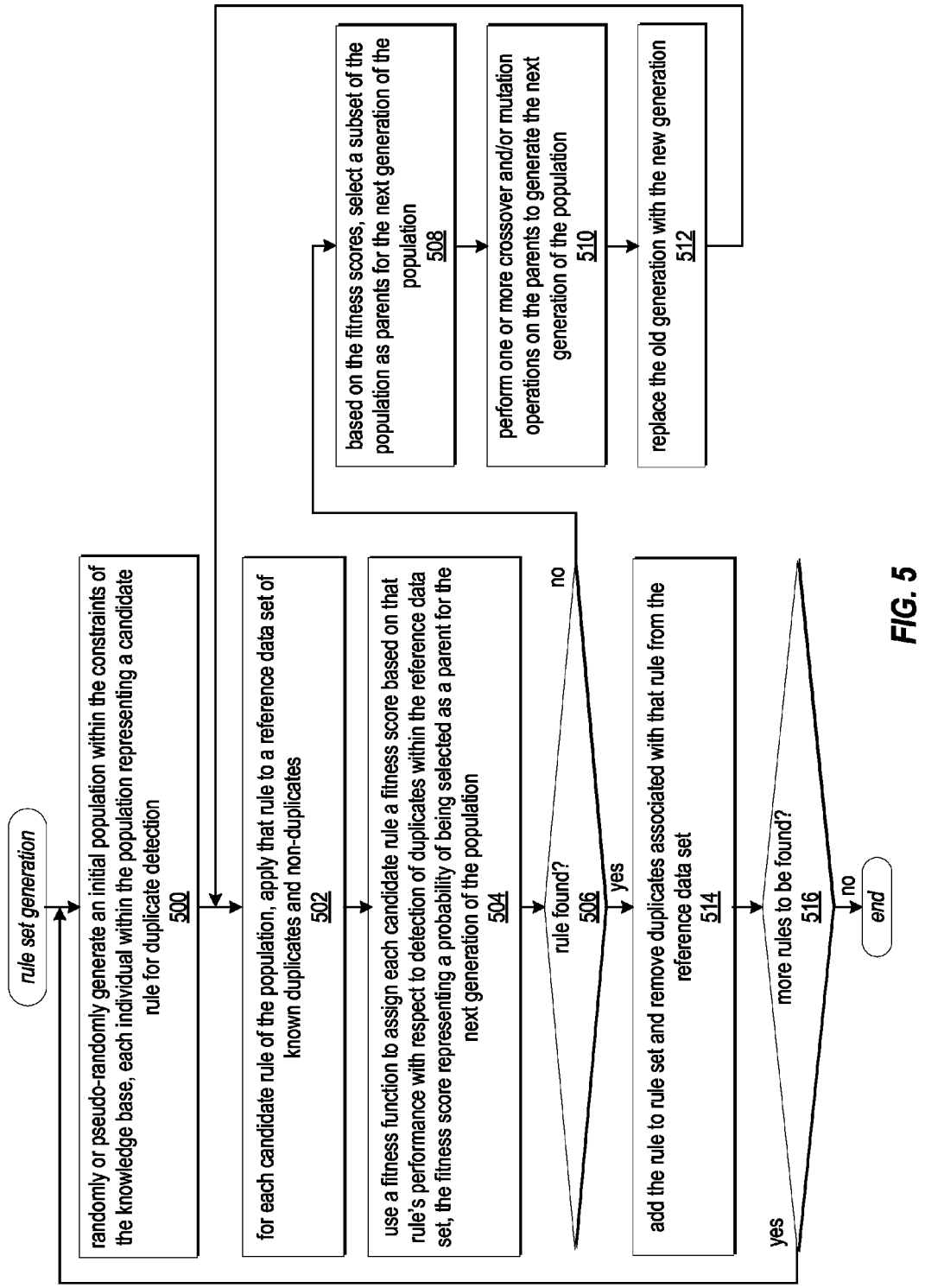
FIG. 5 illustrates a flowchart of an example method for using genetic techniques to generate a rule set for duplicate detection, according to some embodiments.

In various embodiments, the genetic creation of a rule set may be performed by a genetic rule generator component. FIG. 4 illustrates a system configuration including a genetic rule generator, according to some embodiments. In various embodiments, genetic rule generator 400 may be configured to utilize genetic techniques and/or genetic algorithms to generate rule set 418 of rules data store 416. In various embodiments, genetic rule generator 400 may be implemented on a host system 414. In various embodiments, host system 414 may be a computer, such as the computer system of FIG. 10 described below. In various embodiments, genetic rule generator 400 may be configured to generate rule set 418 according to a method for genetic rule creation, such as that of FIG. 5. For clarity of description, FIGS. 4 and 5 are described collectively herein. Furthermore, note that while the method of FIG. 5 is described herein as being performed by genetic rule generator 400, the method need not be performed by any specific component in some cases. For instance, in some cases, the method of FIG. 5 may be performed by some other component or computer system, according to some embodiments. In various embodiments, the method of FIG. 5 may be performed by a computer, such as the computer system of FIG. 10.

As illustrated at block 500, the method may include genetic rule generator 400 randomly or pseudo-randomly generating an initial population of rules within the constraints of a knowledge base. In various embodiments, each individual within the population may be a candidate rule for detecting duplicate item description entries (e.g., different item description entries for the same item). One example of such constraints includes rule constraints 404 of knowledge base data store 402. Generally, rule constraints 404 may include any constraint on the manner in which candidate rules are generated. For instance, in some embodiments, a given constraint may place restrictions on which fields of a pair of item description entries may be compared. This may prevent the genetic rule generator 400 from needlessly wasting computation resources on rules that are likely to provide inferior results. For instance, one example constraint might specify that the "color" field from one item description entry cannot be compared to a "size" field of another item description entry. For example, even though item description information may vary across suppliers, suppliers are unlikely to specify an item's color within a size field and vice versa. However, other variabilities may occur across merchant data. For instance, as described above, one supplier may refer to an item identifier as a part number whereas another identifier may refer to that same identifier as a model number. As described in more detail below, the rules described herein may be genetically adapted or evolved to identify similarities among this type of semi-structured item description information.

Figure 6:
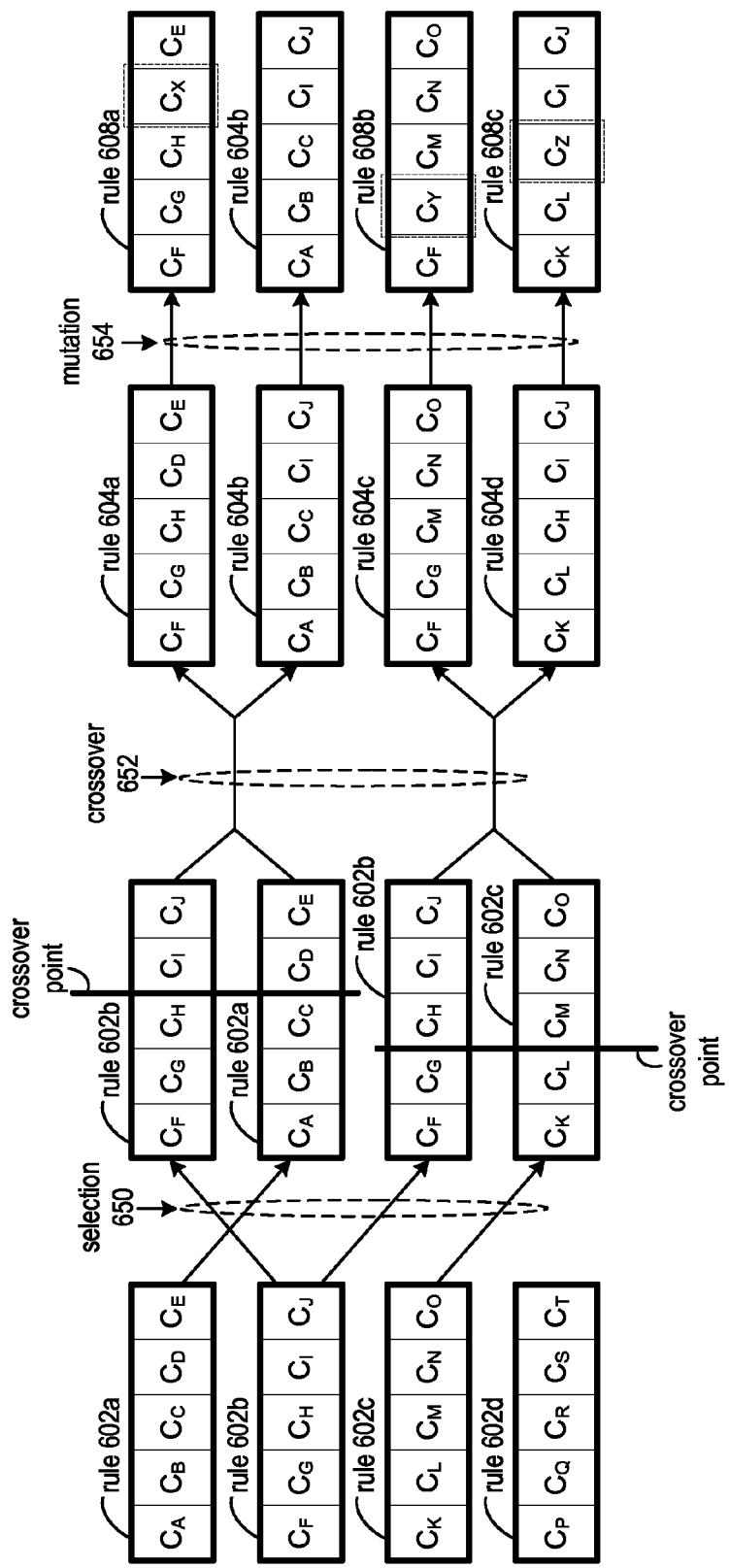
FIG. 6 illustrates a block diagram of performing selection, crossover, and mutation on candidate rules that include multiple different conditions, according to some embodiments.

In various embodiments, to randomly or pseudo-randomly generate a given rule within the initial population, the method may include the genetic rule generator randomly selecting rule conditions from a set of possible rule conditions within the constraints set forth by constraints 404. For instance, example rule conditions are described above with respect to rule conditions 304. In various embodiments, the quantity of rule conditions in a given rule may also be generated randomly or pseudo-randomly. Likewise, relationships (e.g., Boolean relationships) between the rule conditions of a given rule may also be randomly or pseudo-randomly generated in some embodiments. FIG. 6, which is also collectively described herein along with FIGS. 4 and 5, illustrates a non-limiting example initial population of candidate rules 602a-d. In this non-limiting example, the initial population of rules consists of four rules; however, in various embodiments any quantity of rules (e.g., more than four) may be generated as part of the initial population. In the illustrated embodiment of FIG. 6, conditions $C_A$-$C_E$ represent five randomly or pseudo-randomly selected conditions that make up rule 602a. Likewise, conditions $C_F$-$C_J$ represent five randomly or pseudo-randomly selected conditions that make up rule 602b, conditions $C_K$-$C_O$ represent five randomly or pseudo-randomly selected conditions that make up rule 602c, and conditions $C_P$-$C_T$ represent five randomly or pseudo-randomly selected conditions that make up rule 602d. In various embodiments, each rule condition of FIG. 6 may be similar to any of the rule conditions described herein. For instance, rule conditions may be similar to rule conditions 304 of FIG. 3 described above.

As illustrated at block 502, the method may include the genetic rule generator, for each candidate rule of the population, applying that rule to a reference data set of known duplicates and non-duplicates. One example of this reference data set includes reference item description entries 406 of reference data store 412. In various embodiments, duplicate information 408 may indicate which pairs of item description entries (from entries 406) are duplicates (e.g., entries that may be different across one or more fields but nevertheless describe the same item, such as entries 202 and 204 of FIG. 2). In various embodiments, non-duplicate information 410 may indicate which pairs of item description entries (from entries 406) are not duplicates. In various embodiments, the duplicate and non-duplicate information may be determined prior to the genetic analysis. For instance, a system administrator or operator may evaluate reference item description entries 406 to definitely determine which pairs of items are duplicates and not duplicates as well as store such information within reference data store 412. In various embodiments, reference item description entries may be a sample taken from item description entries 426, which may represent a larger group of item description entries. For instance item description entries 426 may represent the item description entries for an entire electronic catalog of items or some portion thereof (e.g., a portion pertaining to a product category, such as automotive or lawn and garden).

As illustrated at block 504, the method may include the genetic rule generator using a fitness function to assign each candidate rule a fitness score based on that rule's performance with respect to detection of duplicates within the reference data set (e.g., within reference item description entries 406). In various embodiments, the fitness score for a given candidate rule may represent that candidate rule's probability of being selected as a parent for the next generation of the population. In this way, candidate rules with relatively large fitness scores will be more likely to become parents and fitness scores with relatively small fitness scores will be less likely to become parents. In various embodiments, the genetic rule generator 400 may determine measures of precision and recall for each candidate rule in the population and generate a corresponding score using a fitness function that is based at least in part on measures of precision and recall. One example fitness function may be $$\text{fitness score} = \text{recall} \times 0.999^{NR} \times 0.9999^{NT} + \beta.$$

In various embodiments, this fitness function may be utilized when the precision of a candidate rule is 100% (or some other configurable threshold). Also note that recall of the fitness score may be a positive value. Furthermore, NR may represent the number of non-null rule conditions. For instance, as the number of non-null rule conditions increases, the fitness score above will decrease. In this example, the larger the quantity of non-null rule conditions, the smaller the probability that the respective rule will be selected as a parent for the next generation of candidate rules. In other words, candidate rules are penalized for having large quantities of non-null rule conditions in some cases. Furthermore, NT may represent the number of tokens (e.g., parsed terms or phrases) within one or more conditions of the candidate rule being evaluated. In this way, candidate rules may be penalized for having verbose rule conditions in some cases (e.g., simpler rules may be favored in some embodiments). In various embodiments, if precision is below 100% (or some other configurable threshold), the fitness score may be set to $\beta$. In this way, candidate rules may be penalized for having poor precision. In some embodiments, $\beta$ may be some small positive value (e.g., 0.02). In this way, in some embodiments, even candidate rules that do not exhibit strong fitness scores have at least some chance of being selected as a parent for the next generation of rules. While the number of rule conditions and the quantity of tokens are provided as examples of factors that influence the fitness scores described herein, the fitness scores may in various embodiments utilize any measure of rule complexity and/or expressiveness to generate a fitness score. Generally, these measures may provide some indication of the computing resources required to evaluate the rules; computationally simple rules may in some embodiments be preferred over more complex rules.

After block 504, the method may proceed to block 506, at which point the genetic rule generator may determine whether a rule has been found. In various embodiments, this may include comparing a measure of recall for the current generation of candidate rules to a measure of recall for the previous generation of candidate rules. (This aspect of the method may be skipped for the initial population.) For instance, in some cases, this measure of recall may include average recall for each candidate rule in the populations. In other cases, this measure of recall may include a measure of recall for the best rule (e.g., the rule with the largest recall) of each population. In various embodiments, if the measure of recall has not improved by a certain quantity relative to the last generation (e.g., has not increased by a configurable percentage) and/or has not increased within a certain number of iterations, the method may include genetic rule generator 300 determining that a rule has been found. In cases where the measure of recall is not improving (e.g., has not improved beyond some configurable threshold of recall improvement) at block 506, the genetic rule generator may determine that a rule has been found, and the method may proceed to block 514 (described in more detail below). In cases where the measure of recall is still improving (e.g., improved beyond some configurable threshold of recall improvement) at block 506, the method may proceed to block 508.

As illustrated at block 508, the method may in various embodiments include the genetic rule generator 400 selecting a subset of the population of candidate rules as parents for the next generation of the population based on the fitness scores that were generated for the candidate rules of the initial population. As noted above, the fitness score for a given candidate rule may represent that candidate rule's probability of being selected as a parent for the next generation of the population. Generally, candidate rules with larger fitness scores will be more likely to be selected than candidate rules with relatively smaller fitness scores. In some embodiments, a specific quantity of rules may be selected for inclusion within the subset of parents. In other cases, the subset may be selected such that a particular ratio or percentage of the candidate population is selected as parents. In various embodiments, the candidate rules may be weighted within a selection pool based on their respective fitness scores and the method may include the genetic rule generator randomly or pseudo-randomly selecting candidate rules from such selection pool. In some cases, some other type of probabilistic selection may be performed such that the probability of selecting a given candidate rule to be a parent is proportional to that candidate rule's fitness score. In any case, the selected subset of candidate rules may be designated as parents that are to be used to reproduce the next generation of candidate rules. In the illustrated embodiment, this selection process is illustrated as selection 650. For instance, in the illustrated embodiment of FIG. 6, rule 602*d* may have a very small fitness score relative to the fitness scores generated for rules 602*a*-*c*. In this case, rules 602*a*-*c* are probabilistically selected to become parents and rule 602*d* is eliminated from consideration.

As illustrated at block 510, the method may include the genetic rule generator 400 performing one or more crossover and/or mutation operations on the parents to generate the next generation of the population. For instance, examples of crossover and mutation operations are illustrated as crossover 652 and mutation 654 of FIG. 6. In various embodiments, a mutation operation may include selecting a crossover point for a pair of candidate rules and, on one side of the crossover point, swapping the conditions of each rule. For instance, in the illustrated example, a crossover operation is performed on rule 602*a* (including conditions $C_A$-$C_E$) and rule 602*b* (including conditions $C_F$-$C_J$) in order to generate rule 604*a* (including conditions $C_F$-$C_H$ and $C_D$-$C_E$) and rule 604*b* (including conditions $C_A$-$C_C$ and $C_F$-$C_J$). A similar crossover may be performed to generate rules 604*c* and 604*d* from rules 602*b* and 602*c*. As illustrated, the crossover operations may create a new generation of rules that are comprised of the conditions from the previous generation of rules. In various embodiments, before the new generation of candidate rules is finalized, one or mutation operations 654 may also be performed on the conditions of the new generation. In various embodiments, these conditions may be selected randomly or pseudo-randomly. In the illustrated embodiment of FIG. 6, conditions $C_D$, $C_G$, and $C_H$ are randomly selected for mutation. As illustrated, these conditions are mutated (e.g., modified) into new conditions $C_X$, $C_Y$, and $C_Z$. In various embodiments, the mutation operation may include but is not limited to adding a random rule condition, removing a random rule condition, mutating a random element of a random rule condition (e.g., changing a one-way matching requirement to a symmetric matching requirement for an item name comparison), and/or replacing all rule conditions with new random rule conditions. As illustrated in FIG. 6, mutation operation(s) 654 may result in mutated rules 608*a*-*c*; rule 604*b* remains unchanged. In various embodiments the collection of mutated rules 608*a*-*c* and rule 604*b* may make up the new generation of candidate rules.

As illustrated at block 512, the method may include the genetic rule generator replacing the old generation of rules (e.g., rules 602*a*-*d*) with the new generation of rules (e.g., rules 608*a*-*c* and rule 604*b*). In various embodiments, this new generation may become the current generation that is evaluated. After block 512, the method may proceed to block 502, at which point another iteration begins for the current population.

As described above, in cases where the measure of recall is not improving (e.g., has not improved beyond some configurable threshold of recall improvement) at block 506, the genetic rule generator may determine that a rule has been found, and the method may proceed to block 514. For instance, rules may be found when recall plateaus or levels off after some quantity of iterations. In various embodiments, the rule identified by the genetic rule generator may be strongest rule of the population (e.g., the rule with the largest measure of recall). At block 514, the method may further include the genetic rule generator adding the rule to the rule set, such as rule set 418 of FIG. 4. As illustrated, this portion of the method may also include the genetic rule generator removing from the reference data set, the duplicate item description entries that are found with the identified rule. In various embodiments, this may prevent rules that are found during subsequent iterations of the method from overlapping in scope with the current rule.

At block 516, the method may include the genetic rule generator determining whether more rules are to be found. For instance, this may include determining whether overall recall for the generated rule set has leveled off or reached a plateau. If this is not the case the method may proceed to block 500, at which point the genetic rule generator may generator another initial population in order to find a new rule. If the overall recall for the generated rule set has leveled off or reached a plateau, the genetic rule generator may determine that the rule set is complete.

Applying Generated Rules for Duplicate Detection and Other Objectives

In various embodiments, the rule set 418 generated by genetic rule generator 400 may be utilized by a duplicate detection engine 420, which may be implemented on a host system 422. In various embodiments, host system 422 may be a computer, such as the computer system of FIG. 10 described below. While genetic rule generator 400 and duplicate detection engine 420 are illustrated as separate components in FIG. 4, the functionality of these components may be integrated into a common component in some embodiments.

Duplicate detection engine 420 may be configured to apply one or more rules of rule set 418 to detect duplicate item description entries within item description entries 426 of item description data store 424. In various embodiments, duplicate detection engine 420 may also merge duplicate entries into single entries within data store 424. As described above, the presence of duplicates within item description information may have a number of implications. For instance, the presence of duplicate item description entries could result in the creation of two or more item detail pages for the same item. For example, these item detail pages may be served by a network portal 430 of host system 428 to one or more remote clients. Also described above, in some cases, the presence of duplicates may cause unintended partitioning of inventory records. Embodiments may avoid these situations by detecting and merging duplicate entries as described herein.

As described above, in various embodiments, reference item description entries 406 may be a sample (e.g., a subset) of the larger collection of item description entries 426. As such, the quality of this sample may in various embodiments affect the quality and/or performance of rule set 418. For instance, quality of the sample may refer to the degree to which reference item description entries 406 are representative of the larger collection of item description entries 426. One manner in which this may be determined may include a comparison of the precision and/or recall for the rule set when applied to a test sample of entries from item description entries 426. For instance, this test sample may be randomly selected from item description entries 426 in various embodiments. If the precision and/or recall of the rule set vary by a specified quantity across the test set and the reference set, the reference item description information may be updated to be more representative of item description entries 426. For example, if the rule set yields 100% precision for entries 406 but only 95% precision for the test sample of entries, embodiments may update reference item description entries 406 by adding item description entries causing false positive or negatives into reference item description entries 306. In this way, reference item description entries 406 may be updated over time to ensure that it remains representative of item description entries 426.

In various embodiments, while genetic techniques are largely described herein as being utilized to generate a rule set for identifying duplicates within item description information, similar techniques may be utilized to achieve other objectives in various embodiments. In one example, instead of identifying duplicates, the genetic techniques described herein may be utilized to determine items that are similar but not exact duplicates. These types of items may be referred to herein as related items. In various embodiments, knowledge of related items may be utilized to provide item recommendations within an electronic market place, for example. For instance, network portal 440 described above may be configured to provide one or more recommendations to purchase related items that are related to items in which a customer has shown interest, such as items in the customer's browsing history. In one example, a component or widget for indicating a given item's related items may be included within an item detail page for that given item. In this way, a user may quickly and easily locate related items when viewing item detail pages. In various embodiments, to generate a rule set for identifying related items, rule constraints 404 may be altered if necessary but may remain generally similar to those used for duplicate detection. For instance, one example constraint might specify that the "color" field from one item description entry cannot be compared to a "size" field of another item description entry as such a comparison may not yield useful results for determining relatedness. In various embodiments, to generate a rule set for identifying related items, reference item description entries 406, duplicate information 408, and non-duplicate information 410 may be updated for detected related items. For instance, instead of indicating duplicates, information 408 may instead specify pairs of item description entries that have been positively identified as related. Likewise, instead of indicating non-duplicates, information 410 may instead specify pairs of item description entries that have been positively identified as not related. In various embodiments, genetic rule generator 400 may utilize genetic techniques similar to those described above in order to evaluate this information to generate a rule set for identifying related items.

In various embodiments, similar techniques may be utilized to adapt the genetic rule generator for generating a rule set for identifying items that are not related. For instance, the inputs to the genetic rule generator may be inverted in order to create a rule set for identifying the absence of items within a product catalog, such as item description entries 426. In various embodiments, the rules may be utilized to create a tool for evaluating whether a given item is related to any items within the product catalog. Such a tool may, for example, be utilized by a merchant's buyer's agents to, before sourcing a given item to be added to the product catalog, ensure that items related to the given item are not already included within the product catalog. For instance, as merchants may not have unlimited resources to stock all items from all vendors or manufacturers, merchants may use such a tool to efficiently utilize existing resources to provide as diverse of a product offering as possible.

Using Previously Generated Machine Learning Models to Seed New Models

In the embodiments described above, the machine learning models (e.g., rule sets) are generally described as being generated from an initial set of randomly generated rules, such as described above with respect to FIG. 4 and block 500 of FIG. 5. In various embodiments, the techniques described herein may also include seeding the rule set generation process with rules from previously generated rule sets. This seeding process may leverage similarities among data sets to decrease the processing time required to generate a new rule set. For instance, consider the non-limiting illustrative example of a previous rule set generated for apparel items; one or more rules from this rule set may be utilized as seeds for a new rule set generation process for Halloween costumes. By utilizing the previously generated apparel rules as seeds, the process for generating rules for a Halloween costume data set may be accelerated. In some embodiments, this acceleration may at least in part be caused by the two data sets (e.g., apparel and Halloween costumes) sharing at least some attributes or similar attributes. For instance, attributes like size and color may be important to both apparel and Halloween costumes. The type of data set for which rules are being generated and/or the type of rules (rules for duplicate detection, related items, etc) may be taken into consideration when selecting which seed rules to utilize. This process is described in more detail below with respect to the method Figures.

Figure 7:
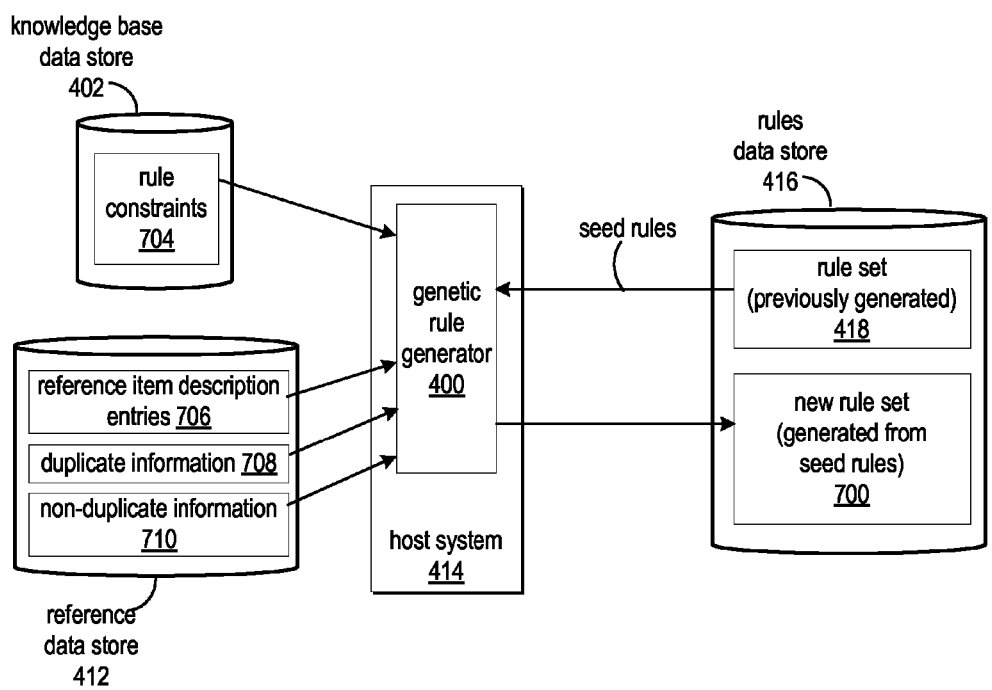
FIG. 7 illustrates of another block diagram of the elements of a system and method for seeding rule-based machine learning models, according to some embodiments.

FIG. 7 illustrates the seeding techniques described herein implemented by a genetic rule generator, such as genetic rule generator 400. In the illustrated embodiment of FIG. 7, elements having numerals similar to respective elements of FIG. 4 may be considered to function similar to the manner described above with respect to FIG. 4. For instance, genetic rule generator 400 may use rule constraints 704, reference item description entries 706, duplicate information 708, and non-duplicate information 710 to generate rule set 700, according to the techniques similar to those described above with respect to FIG. 4. The general exception to this may include the use of a seed rules in the rule set generation process, as described in more detail below.

To generate other rules sets, such as new rule set 700, genetic rule generator may be configured to utilize a seeding process to leverage previously generated rules in order to accelerate the process of generating the new rules. For instance, in the illustrated embodiment, genetic rule generator may generate new rule set 700 by using one or more rules from rule set 418 (which is generated as described above with respect to FIG. 4) as seeds. For instance, whereas rule set 418 was generated by evolving (e.g., through crossover/mutation operations) an initial random or pseudo-random rule set over multiple iterations, rule set 700 may be generated by evolving rule set 418, which may accelerate the generation of rule set 700 relative to generating those rules from an initial rule set comprised entirely of random or pseudo-random rules. In some embodiments, rules from rules set 418 may be selected for seeding based on determining a similarity between reference item description entries 706 and reference item description entries 406. For instance, within the context of the non-limiting example above, reference item description entries 406 might represent item description entries for apparel items and reference item description entries 706 might represent item description entries for Halloween costumes.

In other embodiments, the same reference data may be used but the fitness function utilized by genetic rule generator 400 may be different, such as fitness functions tailored to different objectives. For instance, one of these objective may be the detection of duplicate information items (e.g., duplicate item description entries), as described herein. Another objective may include determining that items are related but not duplicates, which may be useful for generating advertisements or recommendations for related items, for example. In other example, a fitness function may be tailored for the objective of identifying unique items, or items that are unrelated. In yet another example, a fitness function may be tailored for the objective of identifying items of a common title set, which may include different products (e.g., physical books, audio books, electronic books, etc) that convey a common work of art (e.g., the same novel). Title sets may also apply to other types of content including but not limited to movies (e.g., different formats of the same movie).

Selection of the seed rules may vary across different embodiments. In some embodiments, the particular rules to be utilized for seeding may be selected based on a commonality between the data set on which the previous rule set is generated (e.g., reference item description entries 406) and the new data set (e.g., reference item description entries 706). For instance, within the context of the non-limiting example above, reference item description entries 406 might represent item description entries for apparel items and reference item description entries 706 might represent item description entries for Halloween costumes. Other similarities across data sets may include similarities across data sets for common product categories sold in different regions (e.g., different countries) and/or languages. Similarities between this data may also result in at least some similarities among the rules used to analyze each of these data sets. In this way, by starting with at least some of the previously generated rules as seeds, embodiments may accelerate the generation of the new rule set (e.g., compared to beginning rule generation with a set entirely comprised of random or pseudo-random rules, as was the case in FIG. 4).

In some embodiments, previously generated rules may be selected for inclusion within the set of seed rules based on a commonality between the objectives to be solved with the machine learning rules. For instance, the previously generated rules may be generated for duplicate detection whereas the new rules are to be generated for title set identification. Even though these two objectives are different, they may be determined to be similar enough that the rules from one may successfully be used as seeds for the other.

As described herein, embodiments may include generating rules for specific data sets, such as item description for a particular product category. In various instances, these data sets may be updated over time, such as when new item description information 104 is received. In these instances, when new rule sets are generated for these updated data sets, embodiments may utilize the previously generated rules for that data set to seed the new rule set generation. As is the case for the other examples described herein, this process may significantly reduce the processing time for determining the new rules.

In some embodiments, in addition to seeds from previously generated rule sets, the genetic rule generator may insert at least some randomly or pseudo-randomly generated rules into the set of seed rules that are utilized. This may ensure a certain level of genetic diversity across generated rules as well as prevent rules from becoming trapped in local extrema.

Figure 8:
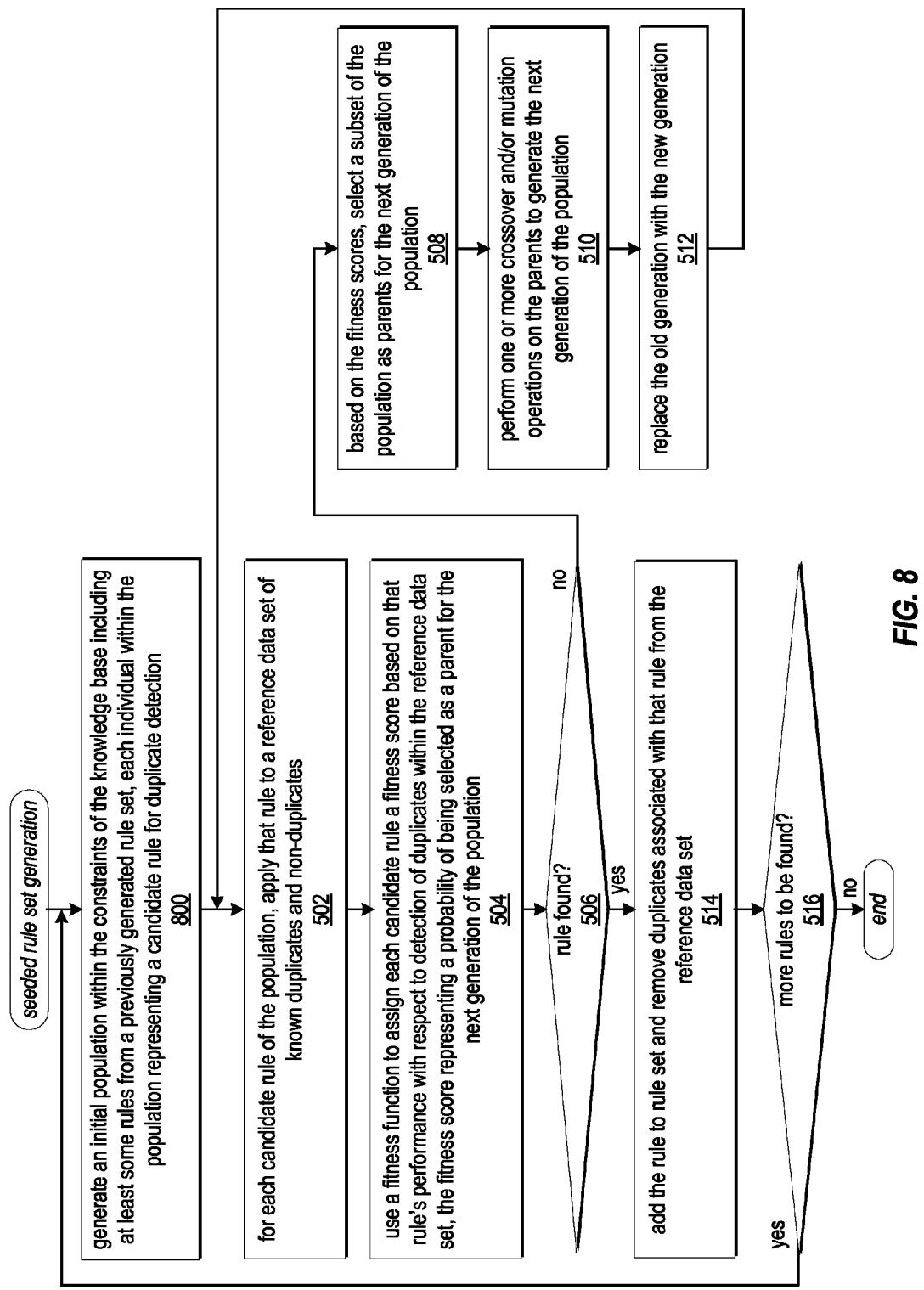
FIG. 8 illustrates a flowchart of an example method for using seeding techniques to generate a rule set for duplicate detection, according to some embodiments.

FIG. 8 illustrates an example method for generating duplicate detection rules using the types of seeding techniques described above. In the illustrated embodiment, the method may begin with block 800, which includes generating an initial population within the constraints of the knowledge base, as described above with respect to FIG. 5. However, unlike the method of FIG. 5, this initial population may include at least some rules from a previously generated rule set. These seed rules may be selected based on a the criteria described above including but not limited to commonalities among the data sets (e.g., same data sets, data sets corresponding to related product categories, etc.) or commonalities among the problems to be solved (e.g., duplicate detection, title set detection, related item detection, unique item detection, etc.). In some cases these commonalities may be identified based on commonalities among the different fitness functions utilized. Also illustrated at block 800, in addition to seed rules from the previously generated rule sets, embodiments may include inserting at least some randomly or pseudo-randomly generated rules into the set of seed rules that are utilized. As noted above, this may ensure a certain level of genetic diversity across generated rules as well as prevent rules from becoming trapped in local extrema.

The remainder of FIG. 8 may operate substantially similar to blocks 502 to 516 of FIG. 5. As such, the details of this portion of the method are not repeated here. Generally, by virtue of beginning with seed rules of block 800, the requisite time to perform the illustrated process of FIG. 8 may be less than the requisite time to perform the method of FIG. 5, which does not incorporate the seeding described herein.

Figure 9A:
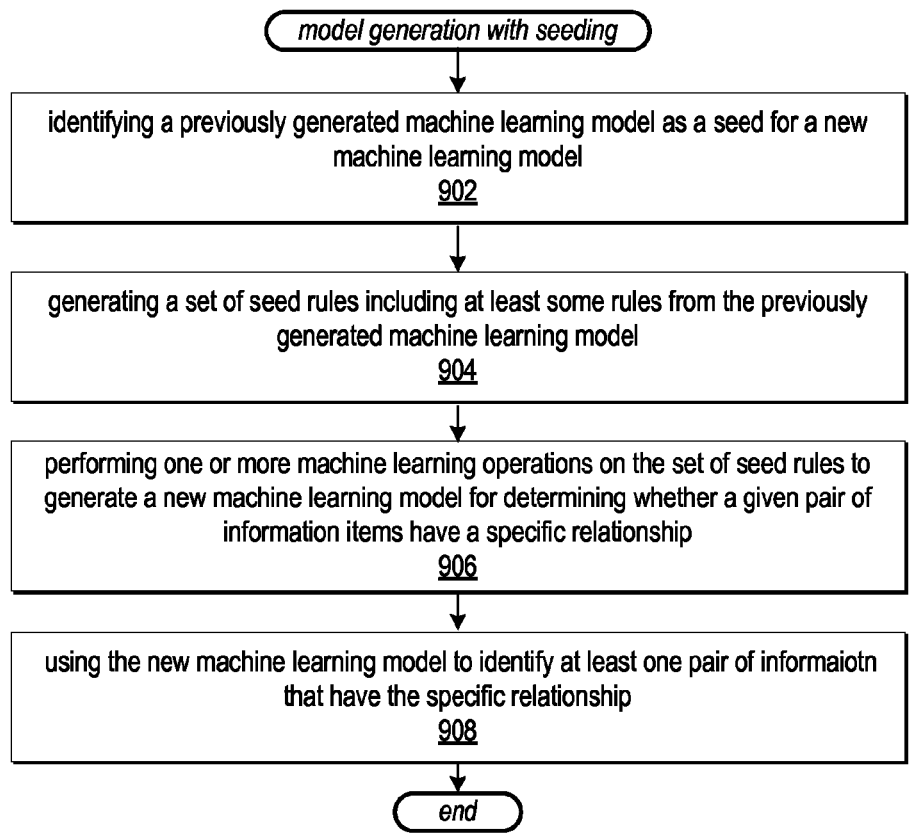
FIG. 9A illustrates a flowchart of an example method for utilizing previously generated machine learning models to seed new machine learning models, according to some embodiments.

While the seeding techniques described above are largely presented within the context of using GA techniques for duplicate detection, generally these techniques may be applied to any machine learning model, including but not limited to GA techniques, decision trees (including boosted decision trees), support vector machines, and other machine learning techniques that may model sets of rules for duplicate detection and the other objectives described herein (e.g., identifying title sets, related items, unique items, etc.). FIG. 9A illustrates an example method for utilizing the seeding techniques described herein along with machine learning techniques. In various embodiments, the illustrated method may be performed by a computer system, such as that of FIG. 10 described below.

As illustrated at block 902, the method may include identifying a previously generated machine learning model as a seed for a new machine learning model. For instance, as described above, machine learning models may be defined by rule sets (e.g., rule sets for identifying duplicates, title sets, related items, unique items, etc.). The previously generated machine learning model that is to be used for seeding may be selected based on similarities among such data sets. More specifically, the particular rules to be utilized for seeding may be selected based on a commonality between the data set on which a previous rule set (or other machine learning model) is generated and the data set for a newly generated rule set (or other machine learning model). In one non-limiting example, the former might represent item description entries for apparel items and the latter might represent item description entries for Halloween costumes. In rule-based machine learning models, similarities between these data sets may also result in at least some similarities among the rules used to analyze each of these data sets. In this way, by starting with at least some of the previously generated rules as seeds, embodiments may accelerate the generation of the new rule set (e.g., compared to beginning rule generation with a set entirely comprised of random or pseudo-random rules, as was the case in FIG. 4). In other embodiments, previously generated rules may be selected for inclusion within the set of seed rules based on a commonality between the objectives to be solved with the machine learning models. For instance, the previously generated rules may be generated for duplicate detection whereas the new rules are to be generated for title set identification. Even though these two objectives are different, they may be determined to be similar enough that the rules from one model may successfully be used as seeds for the other. In some cases, embodiments may include generating rules for specific data sets, such as item description for a particular product category. In these instances, a given data set may be updated over time, such as when new item description information is received. In these instances, when new rule sets are generated for these updated data sets, embodiments may utilize the previously generated model (e.g., previously set of rules generate with GA or a decision tree) for that data set to seed the generation of the new model (e.g., to seed generation of the new rule set in GA or a decision tree). As is the case for the other examples described herein, this process may significantly reduce the processing time for determining the new rules.

As illustrated at block 904, the method may further include generating a set of seed rules including at least some rules from the previously generated machine learning model. This portion of the method may include aggregating the rules selected at block 902 along with at least some random or pseudo randomly generated rules. (In some cases, inclusion of these random/pseudo-random rules may be optional.) In various embodiments, inclusion of these random/pseudo-random rules may ensure a certain level of genetic diversity across generated rules as well as prevent rules from becoming trapped by local extrema.

As illustrated at block 906, the method may further include performing one or more machine learning operations on the set of seed rules to generate a new machine learning model (e.g., a new set of GA rules or decision tree representing the rules) for determining whether a given pair of information items have a specific relationship. For instance, performing these machine learning operation may include using the GA techniques described herein (e.g., crossover/mutation) to evolve the initial set of seed rules one or more times in order to generate the new machine learning model (e.g., the new set of rules). This specific relationship may include determining whether information items (e.g., item description entries) are duplicate items, non-duplicate items, related items, unique items, or items of the same title set, as described herein. In some cases, this specific relationship may be utilized to identify related advertisements pertinent to certain items, estimate sales velocity or volume for new items, or determine other nearest-neighbor relationships. As illustrated at block 908, the method may also include using the new machine learning model (e.g., new set of GA rules or new decision tree) to identify at least one pair of information items that have the specific relationship. In the case of duplicate detection, duplicate item description entries may be merged according to the techniques described above.

Figure 9B:
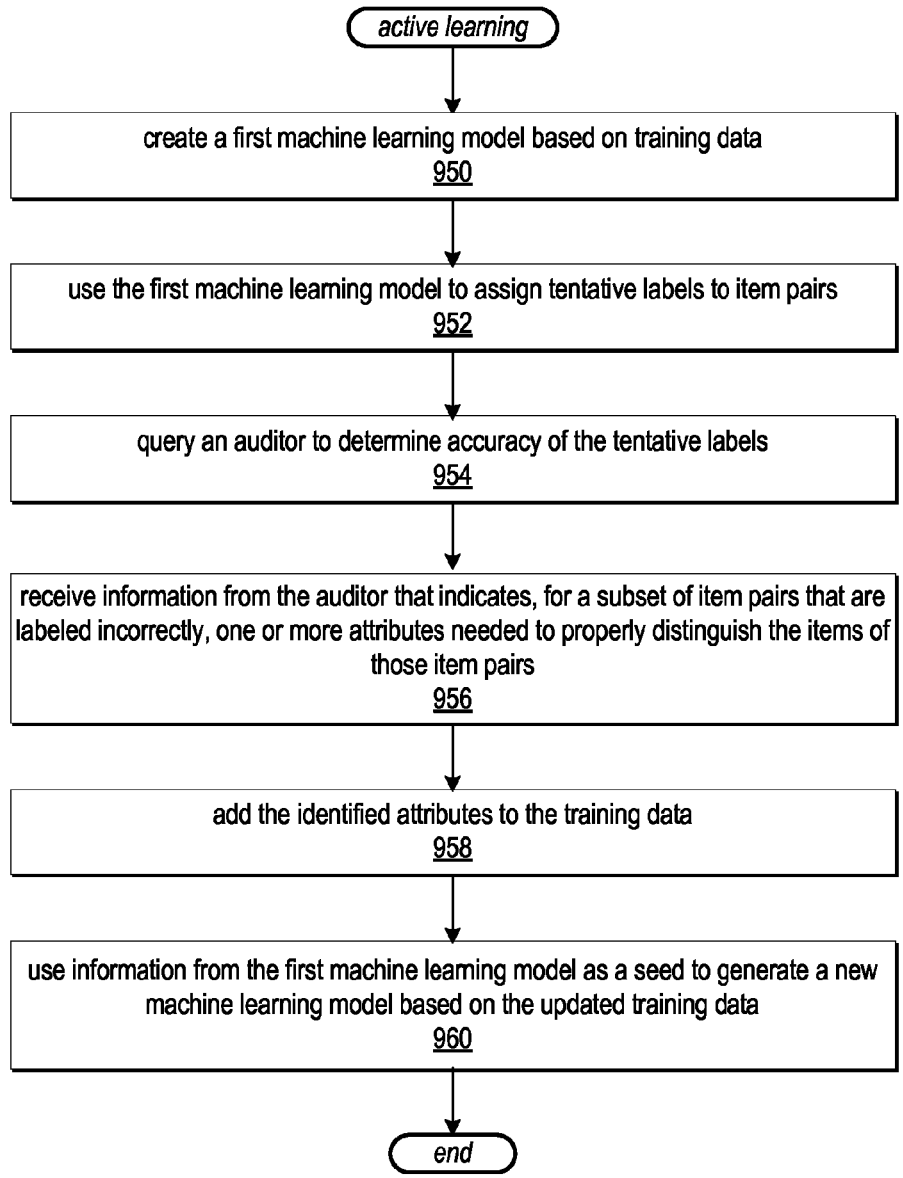
FIG. 9B illustrates a flow chart of an example method for applying active learning techniques to the seeding techniques described herein, according to some embodiments.

FIG. 9B illustrates a flow chart of an example method for applying active learning techniques to the seeding techniques described herein, according to some embodiments. In various embodiments, the illustrated method may be implemented by a computer system, such as that of FIG. 10 described below. As illustrated at block 950, the method may include creating a first machine learning model based on training data (e.g., reference item description entries and duplicate/non-duplicate information). This portion of the method may include generating any of the machine learning models described herein (e.g., a set of GA rules) with or without seeding from previous models.

As illustrated at block 952, the method may also include using the first machine learning model to assign tentative labels to items pairs (e.g., pairs of item description information). In a non-limiting example where the generated model is a duplicate detection model, the method may include using that model to assign labels of duplicate or non-duplicate to different item pairs. As illustrated at block 954, the method may include querying an auditor to determine accuracy of the tentative labels. For instance, in some embodiments, the method may include using an auditor to identify false positives. In the duplicate detection example, a false positive may result from a situation in which the generated model assigns a duplicate label to an item pair when that item pair is not actually a duplicate pair. In some cases, false positives may be caused by lack of detail in the training data set. For instance, the training data set may lack attributes that distinguish different types of items. In one non-limiting example, two similar apparel items may only differ by the quantity of buttons included in each item. If the training data does not include the distinguishing attribute(s) (in this case quantity of buttons), the model generated based on that training data may not be able to properly label other items that are distinguished by these attributes. As such, in block 956, the method may include receiving information from the auditor that indicates, for a subset of item pairs that are labeled incorrectly, one or more attributes needed to properly distinguish those item pairs. In the apparel example above, an example of these attributes is the button quantity attribute.

As illustrated at block 958, the method may also include adding the identified attributes to the training data. By improving the training data with the needed attributes, models generated from this data may improve their accuracy when labeling item pairs. As illustrated at block 960, the method may include using information from the first machine learning model as a seed (with any of the seeding techniques described herein) to generate a new machine-learning model based on the updated training data. By generating the new model based on the updated training data that includes the requisite distinguishing attributes, the labeling accuracy of the new machine-learning model improved relative to the first machine learning model. Furthermore, by utilizing seeding techniques, generation of the new machine-learning model need not start from scratch and may instead include, e.g., rules from the previously generated model, which may minimize computation time and/or improve the quality of rules generated.

Example Computer System

Various embodiments of the system and method for seeding rule-based machine learning models, as described herein, may be executed on one or more computer systems, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement any functionality of the genetic rule generator 400 described above. Additionally, data 1032 of memory 1020 may store any of the information or data structures described above, including but not limited to feature rule constraints 404, reference item description entries 406, duplicate information 408, non-duplicate information 410, rule set 700, and/or rule set 418. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
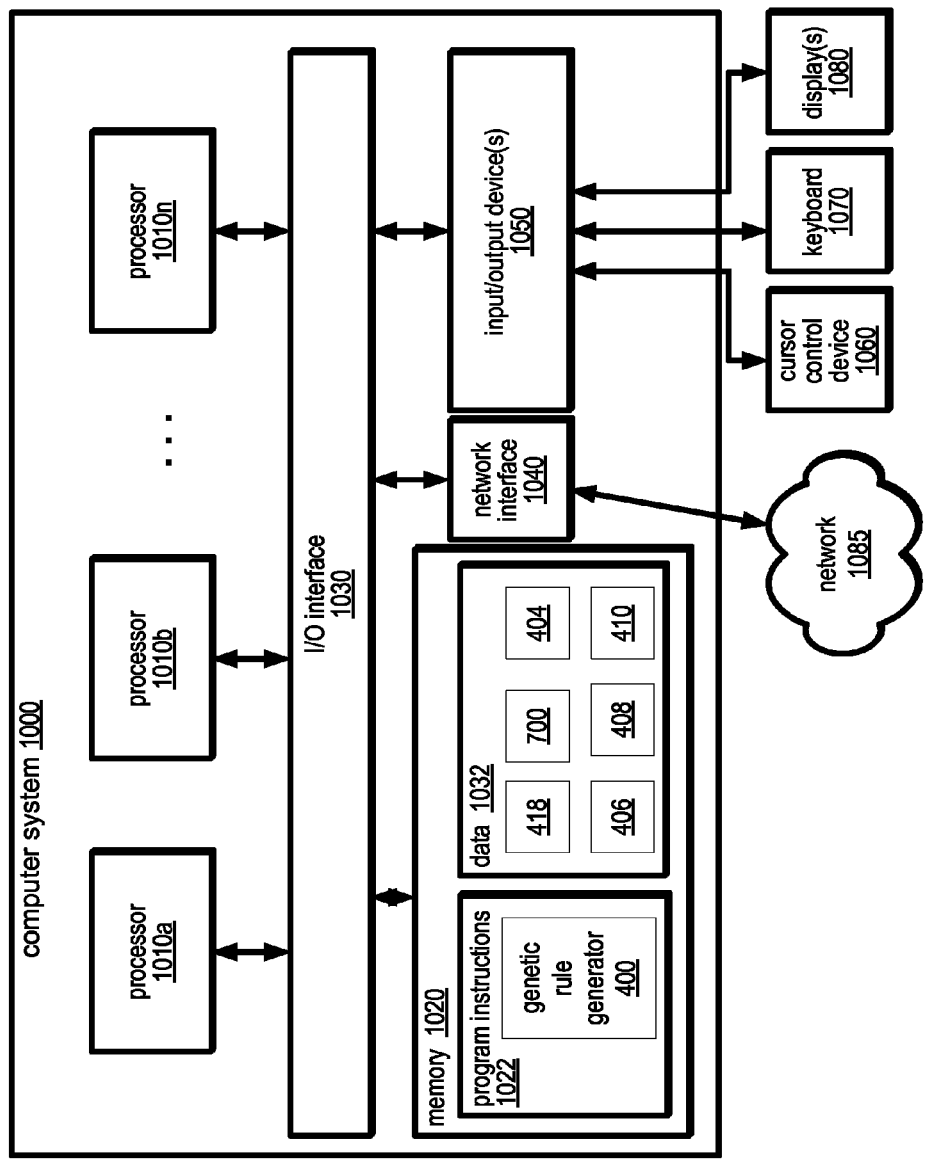
FIG. 10 illustrates one example of a computer system suitable for implementing various elements of the system and method for seeding rule-based machine learning models, according to some embodiments.

As shown in FIG. 10, memory 1020 may include program instructions 1022, which may be processor-executable to implement any element or action described above. In one embodiment, the program instructions may implement the methods described above, such as the methods illustrated by FIGS. 5 and 8-9. In other embodiments, different elements and data may be included. Note that data 1032 may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
generating a set of seed rules comprising:
one or more rules resulting from one or more previously performed machine learning operations that were previously performed in regard to a set of item description entries, and
one or more randomly or pseudo-randomly generated rules;
performing one or more machine learning operations on the set of seed rules to generate a set of duplicate detection rules for determining whether a given pair of item description entries is a duplicate pair, wherein a given duplicate pair represents different item description entries that describe a common item,
wherein said performing the one or more machine learning operations on the set of seed rules is performed in regard to another set of item description entries,
wherein the other set of item description entries includes one or more differences from the set of item description entries in regard to which the one or more previously performed machine learning operations were previously performed; and
applying the set of duplicate detection rules to multiple item description entries to identify at least one duplicate pair of item description entries.

2. The computer-implemented method of claim 1, further comprising merging the at least one duplicate pair of item description entries into a single combined item description entry for the common item.

3. The computer-implemented method of claim 1, wherein performing said one or more machine learning operations includes performing genetic algorithm (GA) operations including one or more of: a mutation operation or a crossover operation.

4. A computer-implemented method, comprising:
generating a set of seed rules comprising:
one or more rules resulting from one or more previously performed machine learning operations, and
one or more randomly or pseudo-randomly generated rules;
performing one or more machine learning operations on the set of seed rules to generate a new set of rules for determining whether a given pair of information items have a specific relationship, wherein:
said performing the one or more machine learning operations on the set of seed rules is performed in regard to a set of information items including one or more differences from another set of information items used in said generating the set of seed rules, or
the specific relationship is different than another specific relationship for which the set of seed rules was generated; and
applying the new set of rules to one or more pairs of information items to identify at least one pair of information items as having the specific relationship.

5. The computer-implemented method of claim 4, wherein the specific relationship between the information items of the at least one pair includes one or more of:
a relationship indicating the information items of the at least one pair are duplicates, wherein duplicate information items describe a common item;
a relationship indicating the information items of the at least one pair are related but not duplicates;
a relationship indicating the information items of the at least one pair are unrelated items; or
a relationship indicating the information items of the at least one pair are members of a common title set, the title set including different products conveying a common work of art.

6. The computer-implemented method of claim 4, wherein performing said one or more machine learning operations includes performing genetic algorithm (GA) operations including one or more of: a mutation operation or a crossover operation.

7. The computer-implemented method of claim 4, wherein performing one or more machine learning operations on the set of seed rules to generate the new set of rules comprises:
for each seed rule, applying that rule to a reference data set including known duplicates and non-duplicates in order to determine a measure of that seed rule's performance with respect to detecting duplicates;
assigning each seed rule a fitness score based on the respective performance measurement for that seed rule, wherein the fitness score of a given seed rule is representative of that seed rule's probability of being selected as a parent for a new generation of rules;

based on the fitness scores, selecting a subset of the population of seed rules as parents for the new generation of rules;

performing one or more crossover or mutation operations on the parent seed rules to generate the new generation of rules; and selecting said new set of rules from the new generation of rules or one or more subsequent generations of rules.

8. The computer-implemented method of claim 4, wherein the one or more rules resulting from one or more previously performed machine learning operations are selected for inclusion within the set of seed rules based on a commonality among the data sets on which the one or more previously performed machine learning operations and the one or more newly performed machine learning operations are performed.

9. The computer-implemented method of claim 8, wherein said commonality among the data sets includes the data sets representing item description information of a same product category or related product categories.

10. The computer-implemented method of claim 4, wherein the one or more rules resulting from one or more previously performed machine learning operations are selected for inclusion within the set of seed rules based on a commonality between the one or more previously performed machine learning operations and the one or more newly performed machine learning operations.

11. The computer-implemented method of claim 4, wherein a requisite time to perform the one or more machine learning operations on the set of seed rules to generate the new set of rules is less than a requisite time to generate the new set of rules from a set entirely comprised of randomly or pseudo-randomly generated rules.

12. The computer-implemented method of claim 4, wherein performing the one or more machine learning operations comprises generating based on training data a machine learning model for labeling item pairs as having or not having the specific relationship, wherein the method further comprises adding distinguishing item pair attributes to the training data to improve labeling accuracy of a new model generated based on the updated training data.

13. A system, comprising:
a memory; and
one or more processors coupled to the memory, wherein the memory comprises program instructions executable by the one or more processors to:
perform one or more machine learning operations on a set of seed rules to generate a new set of rules for determining whether a given pair of information items have a specific relationship, wherein the set of seed rules comprises one or more rules resulting from one or more previously performed machine learning operations and one or more randomly or pseudo-randomly generated rules, wherein:
the one or more previously performed machine learning operations were performed in regard to a set of information items including one or more differences from another set of information items used in generating the new set of rules, or
the specific relationship is different than another specific relationship for which the new set of rules was generated; and
apply the new set of rules to one or more pairs of information items to identify at least one pair of information items as having the specific relationship.

14. The computer-implemented system of claim 13, wherein the specific relationship between the information items of the at least one pair includes one or more of:

a relationship indicating the information items of the at least one pair are duplicates, wherein duplicate information items describe a common item;
a relationship indicating the information items of the at least one pair are related but not duplicates;
a relationship indicating the information items of the at least one pair are unrelated items; or
a relationship indicating the information items of the at least one pair are members of a common title set, the title set including different products conveying a common work of art.

15. The computer-implemented system of claim 13, wherein to perform said one or more machine learning operations the program instructions are configured to perform genetic algorithm (GA) operations including one or more of: a mutation operation or a crossover operation.

16. The computer-implemented system of claim 13, wherein to perform the one or more machine learning operations on the set of seed rules to generate the new set of rules, the program instructions are configured to:
for each seed rule, apply that rule to a reference data set including known duplicates and non-duplicates in order to determine a measure of that seed rule's performance with respect to detecting duplicates;
assign each seed rule a fitness score based on the respective performance measurement for that seed rule, wherein the fitness score of a given seed rule is representative of that seed rule's probability of being selected as a parent for a new generation of rules;
based on the fitness scores, select a subset of the population of seed rules as parents for the new generation of rules;
perform one or more crossover or mutation operations on the parent seed rules to generate the new generation of rules; and
select said new set of rules from the new generation of rules or one or more subsequent generations of rules.

17. The computer-implemented system of claim 13, wherein the one or more rules resulting from one or more previously performed machine learning operations are selected for inclusion within the set of seed rules based on a commonality among the data sets on which the one or more previously performed machine learning operations and the one or more newly performed machine learning operations are performed.

18. The computer-implemented system of claim 17, wherein said commonality among the data sets includes the data sets representing item description information of a same product category or related product categories.

19. The computer-implemented system of claim 13, wherein the one or more rules resulting from one or more previously performed machine learning operations are selected for inclusion within the set of seed rules based on a commonality between the one or more previously performed machine learning operations and the one or more newly performed machine learning operations.

20. The computer-implemented system of claim 13, wherein a requisite time to perform the one or more machine learning operations on the set of seed rules to generate the new set of rules is less than a requisite time to generate the new set of rules from a set entirely comprised of randomly or pseudo-randomly generated rules.

21. A non-transitory computer-readable storage medium, storing program instructions computer-executable on a computer to implement a genetic rule generator configured to:
perform one or more machine learning operations on a set of seed rules to generate a new set of rules for determining whether a given pair of information items have a specific relationship, wherein the set of seed rules comprises one or more rules resulting from one or more previously performed machine learning operations, wherein:
- the one or more previously performed machine learning operations were performed in regard to a set of information items including one or more differences from another set of information items used in generating the new set of rules, or
- the specific relationship is different than another specific relationship for which the new set of rules was generated; and apply the new set of rules to one or more pairs of information items to identify at least one pair of information items as having the specific relationship.

22. The non-transitory computer readable storage medium of claim 21, wherein the specific relationship between the information items of the at least one pair includes one or more of:
- a relationship indicating the information items of the at least one pair are duplicates, wherein duplicate information items describe a common item;
- a relationship indicating the information items of the at least one pair are related but not duplicates;
- a relationship indicating the information items of the at least one pair are unrelated items; or
- a relationship indicating the information items of the at least one pair are members of a common title set, the title set including different products conveying a common work of art.

23. The non-transitory computer readable storage medium of claim 21, wherein to perform said one or more machine learning operations the program instructions are configured to perform genetic algorithm (GA) operations including one or more of: a mutation operation or a crossover operation.

24. The non-transitory computer readable storage medium of claim 21, wherein to perform the one or more machine learning operations on the set of seed rules to generate the new set of rules, the program instructions are configured to:
- for each seed rule, apply that rule to a reference data set including known duplicates and non-duplicates in order to determine a measure of that seed rule's performance with respect to detecting duplicates;
- assign each seed rule a fitness score based on the respective performance measurement for that seed rule, wherein the fitness score of a given seed rule is representative of that seed rule's probability of being selected as a parent for a new generation of rules;
- based on the fitness scores, select a subset of the population of seed rules as parents for the new generation of rules;
- perform one or more crossover or mutation operations on the parent seed rules to generate the new generation of rules; and
- select said new set of rules from the new generation of rules or one or more subsequent generations of rules.

25. The non-transitory computer readable storage medium of claim 21, wherein the one or more rules resulting from one or more previously performed machine learning operations are selected for inclusion within the set of seed rules based on a commonality among the data sets on which the one or more previously performed machine learning operations and the one or more newly performed machine learning operations are performed.

26. The non-transitory computer readable storage medium of claim 25, wherein said commonality among the data sets includes the data sets representing item description information of a same product category or related product categories.

27. The non-transitory computer readable storage medium of claim 21, wherein the one or more rules resulting from one or more previously performed machine learning operations are selected for inclusion within the set of seed rules based on a commonality between the one or more previously performed machine learning operations and the one or more newly performed machine learning operations.

28. The non-transitory computer readable storage medium of claim 21, wherein a requisite time to perform the one or more machine learning operations on the set of seed rules to generate the new set of rules is less than a requisite time to generate the new set of rules from a set entirely comprised of randomly or pseudo-randomly generated rules.

* * * * *